June 20, 1933.  D. E. REPLOGLE  1,914,580

ELECTROOPTICAL SYSTEM AND METHOD

Filed Dec. 16, 1930

Delbert E. Replogle
Inventor

By his Attorneys
Darby & Darby

Patented June 20, 1933

1,914,580

UNITED STATES PATENT OFFICE

DELBERT E. REPLOGLE, OF LEONIA, NEW JERSEY, ASSIGNOR TO JENKINS TELEVISION CORPORATION, OF PASSAIC, NEW JERSEY, A CORPORATION OF DELAWARE

ELECTROOPTICAL SYSTEM AND METHOD

Application filed December 16, 1930. Serial No. 502,633.

This invention relates to electro-optical systems and with particularity to methods and means for transmitting images, pictures, or visual representations.

An object of the invention is to provide a scanning or pick-up system which is suitable for different types of television scanning.

Another object of the invention is to employ existing apparatus in a novel arrangement whereby the same apparatus may be utilized for different types of scanning.

Another object is to provide a novel method of scanning a picture.

Another object of the invention relates to a novel method of scanning a moving picture.

A feature of the invention relates to the method of employing the so-called spot scanning system to scan a transparent film either stationary or moving.

Other features and advantages not specifically enumerated will be apparent after a consideration of the following detail descriptions and the appended claims.

Referring to the drawing—

Figure 1:
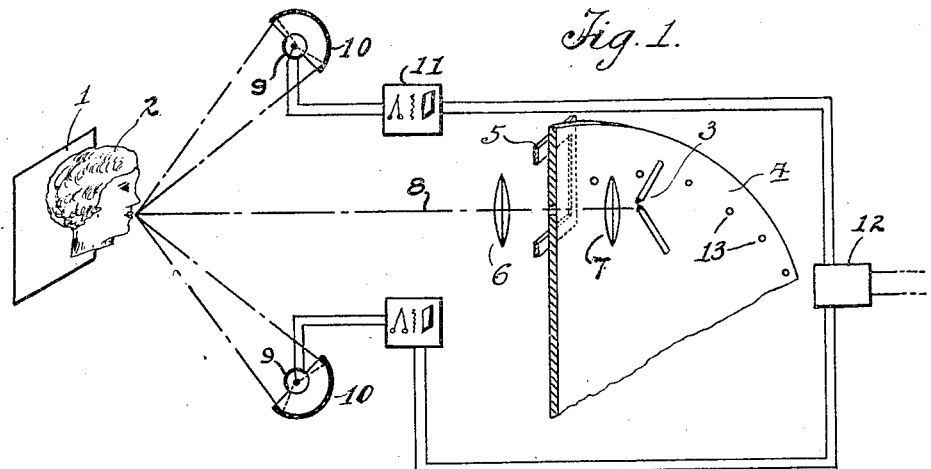
Fig. 1 represents one known type of scanning and pick-up system which is commonly referred to as the moving spot system.

Referring more particularly to Fig. 1, the numeral 1 represents an opaque screen having its surface preferably treated to povide the maximum of diffused reflection. The numeral 2 represents the subject or object whose image is to be transmitted. In accordance with the invention it is preferred to employ a screen 1 which is no smaller in area than the dimensions or contour of the object 2. The numeral 3 represents a source of high intensity light such as an arc lamp or the like, the light from which is projected upon the scanning field of the disc or other well known form of scanner 4. The scanner 4 for the purpose of illustration is shown in the drawing as a spirally perforated disc. For the purpose of limiting the scanning field to the proper size, there is interposed in front of the disc a baffle or aperture plate 5. A suitable optical system represented by the numerals 6 and 7 is provided to project the light upon the subject 2 in the form of a minute spot. Situated around the subject 2, at a convenient distance therefrom, but without interfering with the scanning beam 8, are a plurality of light sensitive cells 9 and in back of each cell is a light collecting mirror 10. The cells 9 are preferably each connected to an associated amplifier 11 whereby the relative magnitudes of the currents from the several cells may be independently adjusted. It will be understood that the members 9, 10 and 11 may be mounted and assembled as a single unit, such for example, as disclosed in application Serial No. 493,278, filed November 4, 1930 of Donald W. Short. The outputs of the amplifiers 11 are also preferably connected to a common amplifier or mixing device 12 as described in application Serial No. 493,953, filed November 7, 1930 of Delbert E. Replogle. The mixed output is then transmitted either by wire or by radio to a receiving station in any well known manner.

In accordance with well known television principles, as the scanning disc 4 rotates, as a result of the spiral arrangement of the scanning perforations 13, the subject 2 is completely scanned during a single revolution of the disc in the form of a rapidly moving intense light spot which is obviously deflected from the subject 2 to the cells 9, thus producing image currents whose amplitude varies in accordance with the shade or light distribution characteristics of the subject 2. The above represents the usual method of so-called spot scanning. When it has been desired to transmit images of still pictures, such as films or the like, it has been heretofore necessary to employ a different type of scanning system from that shown in Fig. 1. Usually in scanning a motion picture film for example, the light beam 8 is projected through the film directly onto the photoelectric or other light sensitive cell.

In actual transmission, for example, in a television studio it may be required at one time to transmit pictures of artists or objects and at another time to transmit motion pictures or even still pictures. Needless to say with the known methods two sets of scanning apparatus must be employed for these two types of pick-up. Furthermore, considerable inconvenience is entailed in transferring from one type of pick-up to the other. In accordance with the present invention it is proposed to employ the same method of pick-up regardless of whether the image to be transmitted represents a living subject or a picture film.

Figure 2:
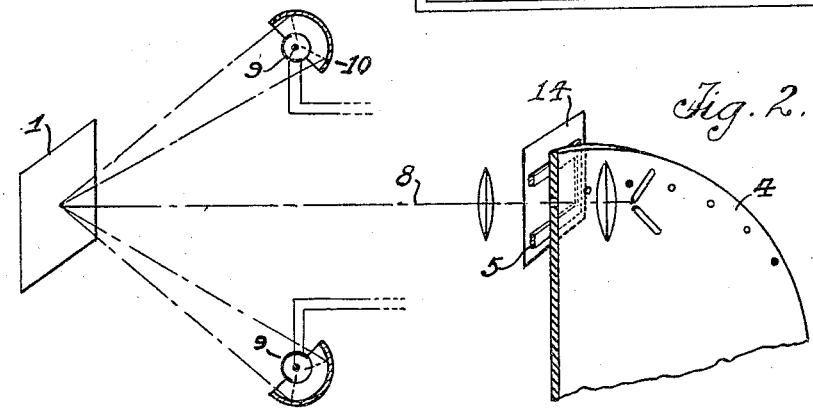
Fig. 2 shows the invention using a moving spot scanning system in connection with a stationary picture.

Accordingly, in Fig. 2 the apparatus is substantially the same as that shown in Fig. 1, and therefore the corresponding apparatus bears the same designation numerals. However, in Fig. 2 the original of the image to be transmitted is in the form of a stationary transparent picture or film 14 which is adapted to be positioned in the path of the scanning beam 8 in accordance with usual methods of film scanning. Thus the scanning beam 8, before it reaches the screen 1, is actually modulated or varied in intensity by the light transmission characteristics of the elemental areas of the film 14 as the disc 4 rotates. However, instead of the modulated beam 8 being projected directly upon a light sensitive cell, as is common in the prior art, this beam strikes the diffusely deflecting screen 1 and is picked up by the cell 9 in the same manner that the said cells pick up the light diffusely reflected from the subject 2. By this arrangement therefore it is possible to use the same apparatus for scanning the picture 14 as is used for scanning the subject 2, it being necessary merely to provide a suitable slot in front of or adjacent the aperture plate 5 to receive the picture 14. Since the picture 14 is stationary it is obviously necessary to provide a disc 4 with scanning elements or apertures either spirally arranged or arranged in any other well known manner so as to enable the entire picture to be scanned during one or more revolutions of the disc 4.

Figure 3:
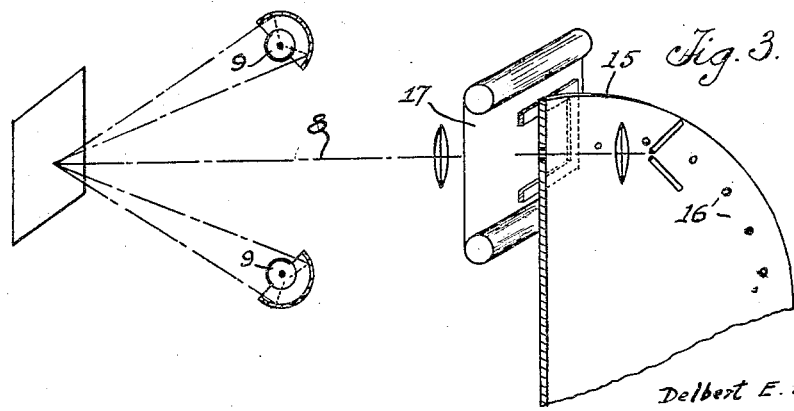
Fig. 3 shows the invention applied to the scanning of a moving picture.

Fig. 3 shows the arrangement for employing the method according to the invention in the transmission of motion picture images. In this figure the numeral 15 represents a scanning disc, drum, band or the like having scanning apertures 16 all arranged at the same distance from the axis of rotation of the scanning disc, instead of being arranged spirally as in Fig. 2. The numeral 17 represents a moving picture film which is advanced either continuously or intermittently as is well known in the motion picture art. If the film is advanced continuously the scanning perforation 16 may be equally spaced around the disc 15. However, if the film 17 is to be advanced intermittently a blank space must be left between the first and last scanning perforations to permit the film to be fed without scanning. The remainder of the apparatus shown in Fig. 3 is substantially the same as that shown in Figs. 1 and 2, the scanning beam 8 being modulated in accordance with the elemental areas of the moving picture film 17. In the case of a continuously moving film it will be understood that the disc 15 in rotating causes the film 17 to be scanned in successive parallel lines.

From the foregoing it will be seen that the entire scanning system is substantially the same, regardless of whether the image to be transmitted is that of a moving subject such as 2, or a transparent film such as 14 or 17, and the change from one method of scanning to the other may be done in a few seconds time without disturbing any of the scanning apparatus.

If desired, in the system shown in Figs. 2 and 3, a mirror or other reflector may be lowered in front of the screen 1, so as to more efficiently collect and reflect the scanning beam 8 onto the photocell or photocells 9. For example a large concave mirror may be lowered or placed in front of the screen 1, and the mirror may have a curvature such that the scanning beam 8 is reflected at all times onto one or more of the cells 9.

While one specific arrangement and type of apparatus is shown in the drawing, it will be understood that the invention is not limited thereto and that various modifications may be made therein without departing from the spirit and scope of the invention.

What is claimed is:

1. The method of scanning a transparent picture which comprises projecting an elemental spot of light through the picture onto a diffusely reflecting surface, moving said spot over the picture at sufficiently high speed to project the picture in a point-by-point fashion on said surface so that it is visible as a complete picture thereon, and energizing a light sensitive device in accordance with the light of said spot reflected from said surface.

2. The method of scanning a transparent film which includes the steps of illuminating a diffusely reflecting screen with a moving scanning spot from a scanning beam, positioning the transparent film in the path of said beam to modulate the intensity of said spot, whereby said spot projects on said screen, in a point-by-point fashion, an image of the film, and translating the light reflected from said screen into corresponding photo-electric currents.

3. The method of scanning which comprises producing an elemental spot of light, projecting said spot on a diffusely reflecting surface, modulating said spot in accordance with the shade characteristics of elemental areas of a picture to be transmitted, moving said spot at sufficiently high speed to project on said surface, in a point-by-point fashion an image of the picture to be transmitted, and positioning a light sensitive device adjacent said screen to be energized by the light diffusely reflected therefrom.

4. The method which comprises producing a constant intensity moving scanning spot of elemental area, modulating the intensity of said spot in accordance with the light transmission characteristics of the elemental areas of a picture to be transmitted, interposing in the path of said spot a diffusely reflecting surface, and moving said spot over said surface at sufficiently high speed to produce on said surface, in a point-by-point fashion, an image of the picture to be transmitted, and positioning in front of said surface a light sensitive device to be energized by the light reflected therefrom.

5. In a system of the character described, means for producing a constant intensity scanning spot of elemental area, a diffusely reflecting screen, means for projecting said spot on said screen, means for modulating said spot in accordance with the shade characteristics of elemental areas of a picture to be transmitted, means for moving said spot at a sufficiently high rate of speed to project on said screen, in a point-by-point fashion, an image of the picture to be transmitted, and a light sensitive device energized by the light reflected from said screen.

6. In a system of the character described the means for producing a constant intensity light spot of elemental area, a diffusely reflecting screen, means for moving said spot at a sufficiently high speed to scan said picture and simultaneously project on said screen, in a point-by-point fashion, an image of said picture, and a light sensitive device adjacent said screen and energized by the light reflected therefrom.

7. In a system of the character described, means for producing a scanning light spot of elemental area, a diffusely reflecting screen, means for moving said spot over a picture to scan the same in a point-by-point fashion, and simultaneously to project an image of said picture in a point-by-point fashion on said screen, and a plurality of light sensitive devices energized by the light of said spot reflected from said screen.

8. In a system of the character described, means for producing a concentrated scanning light spot of elemental area, means for moving said spot over a picture to be transmitted to modulate said spot by the shade characteristics of successive elemental areas of the picture, a screen interposed in the path of the modulated light, said spot in moving over said picture simultaneously projecting on said screen an image of the picture in a point-by-point fashion, and a plurality of light sensitive cells energized by the light diffusely reflected from said screen.

9. In a system of the character described, a diffusely reflecting screen, a scanning light spot of elemental area, means for moving said spot to scan a picture film and to simultaneously project, in a point-by-point fashion, an image of said film on said screen, a plurality of light sensitive devices adjacent said screen, and energized by the light diffusely reflected therefrom.

10. In a system of the character described, the combination of a scanning light spot, a transparent picture film, a diffusely reflecting screen, a television scanner between said spot and screen for moving said spot over said film to scan the film and simultaneously to project on said screen a point-by-point image of said film, and a light sensitive cell positioned to be energized by the light reflected from said screen.

11. A system according to claim 10 in which the scanning spot is moved by means of a scanning device in the form of a spirally perforated disc.

In testimony whereof I have hereunto set my hand on this 12th day of December A.D., 1930.

DELBERT E. REPLOGLE.